UNITED STATES PATENT OFFICE.

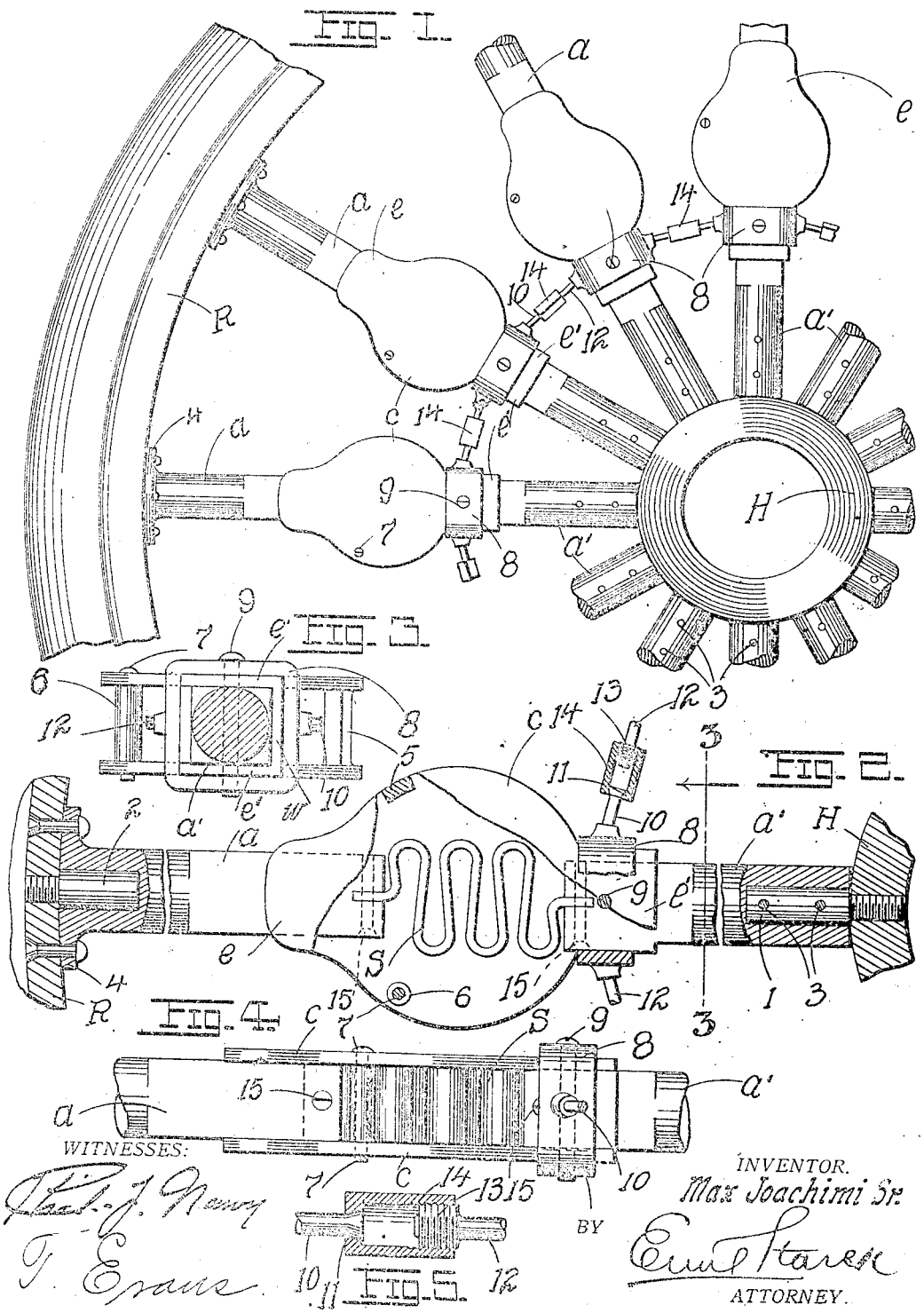

MAX JOACHIMI, SR., OF VERSAILLES, MISSOURI.

VEHICLE-WHEEL.

No. 904,876.　　　Specification of Letters Patent.　　　Patented Nov. 24, 1908.

Application filed June 14, 1907. Serial No. 379,036.

*To all whom it may concern:*

Be it known that I, MAX JOACHIMI, Sr., citizen of the United States, residing at Versailles, in the county of Morgan and State of Missouri, have invented certain new and useful Improvements in Vehicle-Wheels, of which the following is a full, clear, and exact description, reference being had to the accompanying drawings, forming a part hereof.

My invention has relation to improvements in vehicle-wheels; and it consists in the novel construction of wheel more fully set forth in the specification and pointed out in the claims.

In the drawings, Figure 1 is a face view of a portion of an automobile wheel constructed according to my invention; Fig. 2 is an enlarged face view of one of the spokes, parts being broken away; Fig. 3 is a cross section on the line 3—3 of Fig. 2; Fig. 4 is an edge view of the casing which houses the spring; and Fig. 5 is a detail of the coupling or connection between the spokes.

The object of my invention is to provide a wheel which can take the place of the prevailing form of inflated-tire wheels, the improvement being eminently adapted for heavy machines which a foundation of air cannot support to advantage or for any length of time owing to the destruction of the tire.

A further object is to provide a wheel whose spoke sections shall yield only in the plane of rotation of the wheel, so that the wheel can not undergo or suffer any lateral twist or torsion, an objection so common with the majority of spring wheels and inflated-tire substitutes.

The advantages of the present invention will be better apparent from a detailed description thereof which is as follows:

Referring to the drawings, H, represents the hub of the wheel, said hub being provided with a series of radiating studs 1 screwed to the hub, the rim R being likewise provided with a corresponding number of studs 2 disposed in the lines of the radii of the studs 1. The spokes are composed of an outer section $a$ and an inner section $a'$, the opposite terminals of the spoke sections being provided with sockets into which the studs 1 and 2 are received, the sections $a'$ being secured to the studs 1 by pins 3, and the outer terminals of the sections $a$ having flanges 4 riveted or otherwise secured to the rim. The adjacent ends of the spoke sections are received in a casing composed of plates $c$, $c$, terminating in reduced extensions $e$, $e'$, as shown, the plates being spaced apart by a permanent post 5 on one side, and by a removable spacing tube or sleeve 6 on the opposite side, said sleeve being secured in place by a screw 7. The extensions $e'$ are connected together on the side toward the post 5 by a wall $w$, the parts $e'$, $w$, $e'$ thus forming as it were, a socket open at its end, and also on the side toward the removable spacing sleeve 6. This socket receives the adjacent square end of the spoke-section $a'$ (Fig. 2), a strap or band 8 being passed around the socket and secured to the socket walls $e'$, $e'$ and to the spoke-section by means of a screw 9. In this manner the casing becomes secured to the spoke-section $a'$, and when occasion arises to remove the casing, the screw 9 is first taken out, the strap 8 is slipped off toward the hub and allowed to rest on the cylindrical part of the spoke-section, the screw 7 and spacing thimble 6 are removed, leaving the casing to be removed laterally or in the direction toward the permanent post 5. The object of taking out the parts 6 and 7 is to permit the casing to pass the spring S which connects together the adjacent ends of the spoke-sections $a$, $a'$. The spring S (confined as it is between the plates $c$, $c$, of the casing), yields both radially, and also allows the spoke-section $a$ the necessary oscillation in the plane of rotation of the wheel; but since said spoke-section $a$ is confined in its movements between the cheeks or extensions $e$ of the casing, it follows that said member $a$ can not be deflected out of the plane of the wheel's rotation. This leaves the rim R in a fixed relation to the plane of rotation of the wheel, and a twist or torsion in the latter can not result when the vehicle is turning a corner.

Each strap or band 8 is provided on one side with a stem 10 terminating in a flaring head 11, and on the opposite side with a stem 12 terminating in a screw-threaded head 13, a nut 14 having an interiorly screw-threaded portion engaging the head 13, and playing loosely over the stem 10, serving to draw the stems 10 and 12 of adjacent spokes together, and thus tying the spoke-sections $a'$ firmly together. Of course in removing a casing $c$, $c$ as above described, the nuts 14 connecting adjacent spokes, are unscrewed until the heads 13 are released (the stems 10 being of sufficient length to permit the nuts to play along them the required distance), when the casing of any spoke may be removed without disturbing the adjacent spokes. The removal of a casing of course may arise when it becomes necessary to repair a spring S, or insert a new spring, the ends of the spring being simply inserted into sockets of the spoke-sections, and then secured by screws 15.

The inner spoke-sections $a'$ are (as clearly apparent) relatively stationary, the sections $a$ being the movable and yielding members of the spokes. The sections $a'$ thus constitute abutments for the springs S, the latter yielding under excessive weight both radially and in an arcuate direction, but always in the plane of rotation of the wheel, since both the springs and the spoke-sections $a$ are confined between the plates $c$, $c$ constituting the face walls of the casing interposed between the spoke-sections. By leaving the casing open, the spring may be readily cleaned, as it is perfectly accessible.

Having described my invention what I claim is:

1. A vehicle-wheel comprising a hub and rim, spokes composed of two sections secured respectively to the rim and hub and having their adjacent ends spaced a suitable distance apart, a spring connecting the ends of the spoke sections, a casing for the spring secured to one of the spoke-sections, and extensions at one end of the casing for confining the movements to which the other spoke section may be subjected, in the plane of rotation of the wheel, substantially as set forth.

2. A vehicle-wheel comprising a hub and rim, spokes composed of two sections secured respectively to the rim and hub and having their adjacent ends spaced a suitable distance apart, a spring connecting the adjacent ends of the spoke-sections, a casing secured to each of the inner series of spoke-sections and housing the spring, and suitable extensions on the casing walls for confining the radial and oscillating movements to which the outer spoke-sections may be subjected, to the plane of rotation of the wheel, substantially as set forth.

3. A vehicle-wheel comprising a hub and rim, spokes composed of two sections coupled respectively to the rim and hub, a casing comprising two plates disposed parallel to the plane of rotation of the wheel and spaced a suitable distance apart and having extensions for receiving the adjacent ends of the spoke-sections, the inner extension being formed into a laterally open socket, a strap passed about the socket and secured to the inner spoke-section, means for tying the series of straps together whereby the inner spoke-sections are kept in rigid relation, a spring connecting the adjacent ends of the spoke-sections and confined within the casing, the outer extension of the casing walls confining the movements of the outer spoke-sections to planes parallel to the plane of the wheel's rotation, whereby twisting of the wheel is prevented under excessive strain as the vehicle is turning a corner, substantially as set forth.

In testimony whereof I affix my signature, in presence of two witnesses.

MAX JOACHIMI, Sr.

Witnesses:
   Emil Starek,
   T. Evans.